US012486351B2

(12) United States Patent
Bijlard et al.

(10) Patent No.: US 12,486,351 B2
(45) Date of Patent: Dec. 2, 2025

(54) SOLID SURFACE MATERIALS WITH POLYURETHANE MATRIX

(71) Applicant: Covestro Deutschland AG, Leverkusen (DE)

(72) Inventors: Ann-Christin Bijlard, Bergisch Gladbach (DE); Lukas Breuers, Cologne (DE); Joan Miguel Garcia Martinez, Barcelona (ES)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/496,517

(22) PCT Filed: Mar. 21, 2018

(86) PCT No.: PCT/EP2018/057174
§ 371 (c)(1),
(2) Date: Sep. 23, 2019

(87) PCT Pub. No.: WO2018/172413
PCT Pub. Date: Sep. 27, 2018

(65) Prior Publication Data
US 2021/0108021 A1 Apr. 15, 2021

(30) Foreign Application Priority Data
Mar. 24, 2017 (EP) .................... 17162822

(51) Int. Cl.
C08K 3/22 (2006.01)
C08G 18/32 (2006.01)
C08G 18/72 (2006.01)
C08G 18/79 (2006.01)
C08K 3/26 (2006.01)
C08K 3/36 (2006.01)

(52) U.S. Cl.
CPC ....... C08G 18/3206 (2013.01); C08G 18/722 (2013.01); C08G 18/792 (2013.01); C08K 3/22 (2013.01); C08K 3/26 (2013.01); C08K 3/36 (2013.01); C08G 2120/00 (2013.01); C08K 2003/2227 (2013.01); C08K 2003/267 (2013.01)

(58) Field of Classification Search
CPC .............. C08G 18/3206; C08G 18/722; C08G 18/792; C08G 18/246; C08G 2120/00; C08K 3/22; C08K 3/26; C08K 3/36; C08K 2003/2227; C08K 2003/267
See application file for complete search history.

(56) References Cited

U.S. PATENT DOCUMENTS

| 3,996,223 A | 12/1976 | Gupta et al. |
| 4,255,569 A | 3/1981 | Müller et al. |
| 4,532,316 A | 7/1985 | Henn |
| 4,622,361 A | 11/1986 | Gill et al. |
| 4,731,427 A * | 3/1988 | Younes ............... C08G 18/092 528/53 |
| 4,822,827 A * | 4/1989 | Bonk ............... C08G 18/6674 521/170 |
| 4,837,359 A | 6/1989 | Woynar et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |
| 5,914,383 A | 6/1999 | Richter et al. |
| 6,268,057 B1 * | 7/2001 | Mizuno ............... C08G 18/282 428/423.1 |
| 2006/0235095 A1 * | 10/2006 | Leberfinger ............... C08J 9/32 521/56 |
| 2010/0056660 A1 | 3/2010 | Rosthauser |
| 2013/0324631 A1 * | 12/2013 | Kuwamura ........ C08G 18/3876 528/74 |
| 2016/0039967 A1 * | 2/2016 | Rukavina ............... B32B 27/10 428/221 |
| 2020/0181779 A1 * | 6/2020 | Chen .................... H05K 9/0081 |

FOREIGN PATENT DOCUMENTS

| DE | 1954093 A1 | 6/1970 |
| DE | 1670666 A1 | 7/1971 |
| DE | 2414413 A1 | 10/1975 |
| DE | 2452532 A1 | 5/1976 |
| DE | 2641380 A1 | 3/1978 |
| DE | 3700209 A1 | 7/1988 |
| DE | 3900053 A1 | 7/1990 |
| DE | 3928503 A1 | 3/1991 |
| EP | 0255381 A2 | 2/1988 |
| EP | 0336205 A2 | 10/1989 |
| EP | 0339396 A1 | 11/1989 |
| EP | 0798299 A1 | 10/1997 |
| GB | 1145952 A | 3/1969 |
| GB | 1244416 A | 9/1971 |

OTHER PUBLICATIONS

Huber; HN-336 Alumina Trihydrate data sheet, 2011, p. 1.*
Thirumal, M., et al.; Journal of Applied Polymer Science, 2010, vol. 116, p. 2260-2268.*
Cheremisinoff, N.P.; Condensed Encyclopedia of Polymer Engineering Terms, 2001, p. 406-427.*
IUPAC Gold Book, 2014 (Year: 2014).*
International Search Report for PCT/EP2018/057174 mailed Jul. 18, 2018.
Written Opinion of the International Searching Authority for PCT/EP2018/057174 mailed Jul. 18, 2018.

* cited by examiner

Primary Examiner — Jiangtian Xu
(74) Attorney, Agent, or Firm — The Webb Law Firm

(57) ABSTRACT

The present invention relates to polyurethane based solid surface materials with improved dimensional stability which can be made using conventional inorganic fillers without pre-treatment of the fillers.

12 Claims, No Drawings

SOLID SURFACE MATERIALS WITH POLYURETHANE MATRIX

CROSS-REFERENCE TO RELATED APPLICATIONS

This application is a national stage application (under 35 U.S.C. § 371) of PCT/EP2018/057174, filed Mar. 21, 2018, which claims benefit of European Application No. 17162822.5, filed Mar. 24, 2017, both of which are incorporated herein by reference in their entirety.

The present invention relates to polyurethane based solid surface materials with improved dimensional stability during production which can be made using conventional inorganic fillers, preferably without pre-treatment of the fillers.

Solid surface materials are defined as materials formed by a polymer matrix, pigments and fillers that can be processed by sheet shaping or molded products. They are also defined in the ISO Standard 19712-1 UNE.EN: 2013. Solid surface materials are homogenous products, i.e. they have an identical composition throughout their thickness. Due to this feature they can be easily repaired by simple sanding.

Typically, solid surface materials are used in bath and kitchen equipment such as sinks, toilets or countertops. Currently available solid surface materials contain polymer matrices made of acrylic resins or polyester resins. The most frequently used filler is alumina trihydrate.

Apart from casting solid surface materials to give it its final shape another common route is the fabrication of slabs and subsequent post production steps like thermoforming. This means that the final shape of the solid surface material is achieved after the resin is fully cured. Hence, conventional solid surface materials are based on thermoplastic resins. Thermoforming, cutting and gluing is often used to create more complex shapes which cannot be created be casting directly with the disadvantage of a time intensive, manual process.

Conventional solid surface products are often sensitive to UV radiation and to acids, bases and cleaning agents so that they cannot be used in outdoors applications without additional radiation protection. Furthermore, it is known that typical cleaning agents like isopropanol may results in stress crack corrosion. Moreover, it is desirable to produce solid surface materials by reaction injection molding (RIM) as this is a fast and efficient process. The polymer matrices discussed above are, however, not very well suited for this method of production because they require long curing times of up to two hours. Additionally, the conventional matrices show high volume shrinkage during the curing process which negatively affects dimensional stability especially in common low pressure RIM or even cast processes. Therefore, it would be desirable to use a system which is (i) UV-fast without additional treatment, (ii) has a good dimensional stability during the curing process and (iii) has short curing times so that it can be processed by RIM.

In the study underlying the present invention polyurethanes based on aliphatic polyisocyanates were tested and generally displayed promising properties. However, polyurethanes have an important disadvantage: Polyisocyanates easily react even with trace amounts of water to amines. In this process carbon dioxide is generated. If this happens during the production process of a solid body, the carbon dioxide is trapped in the material and forms bubbles. This effect is desired—and even deliberately initiated—in the manufacture of foamed products. For solid surface materials, in contrast, formation of bubbles is not desired as it may give rise to surface defects. Unfortunately, alumina trihydrate, the most commonly used inorganic filler, contains significant amounts of water unless it is dried. Drying the inorganic filler adds another processing step, costs energy and labor. It is therefore to be avoided in an economical manufacturing process.

A preliminary experiment actually indicated that regular, i.e. undried alumina trihydrate, induces bubble formation in reaction mixtures comprising polyisocyanate when using open molds. Therefore, there were considerable doubts whether the combination of polyisocyanates and undried inorganic fillers would be at all suitable for the production of solid surface materials. Surprisingly, experiments performed in a closed mold demonstrated that bubble formation is not an issue if solid surface materials are produced by reaction molding.

Therefore, the problem underlying the present invention could be defined as providing UV-resistant solid surface materials which can be obtained by an economical manufacturing process.

This problem is solved by the embodiments defined in the claims and in the description below.

In a first embodiment, the present invention relates to a polymerizable composition suitable for manufacturing a solid surface material having a glass transition temperature of at least 45° C. comprising
  (i) at least one polyol A1 having an OH-content of at least 25 wt.-%;
  (ii) at least one polyisocyanate A2 comprising at least 60 wt.-% of aliphatic and cycloaliphatic polyisocyanates;
  (iii) at least one organic filler B1; and
  (iv) least one inorganic filler B2, wherein the inorganic filler B2 is not dried;
  wherein the polyol A1 makes up at least 80 wt.-% of all hydroxyl-functional compounds in the polymerizable composition.

A "polymerizable composition" is a composition which can be cured so that the polyol A1 and the polyisocyanate A2 crosslink to form a polyurethane matrix which comprises the organic filler B1 and the inorganic filler B2. The material obtained by curing the polymerizable composition is a solid surface material.

A solid surface material comprises preferably between 5 and 85 wt.-%, more preferably between 12 and 80 wt.-% of organic and inorganic fillers based on the total mass of the polymerizable composition.

The mixture of components A1, A2, B1 and B2 has a density of at least 1000 kg/m$^3$. Preferably, the polymerizable composition does not contain blowing agents outside of microspheres.

Polyol A1

Within the context of this application a polyol A1 is understood as an OH-group containing organic molecule. Preferably, polyol A1 has an average OH-functionality per molecule of at least 2, more preferably at least 3 and an OH— content of at least 25%. Calculation of the respective OH number can be carried out by dividing the sum of all OH-groups from all the individual polyols within the polyol-component by the total number of all molecules within the polyol-component. The advantage of a high OH-functionality is a high resulting network density of the resulting polymer matrix, thus providing high glass transition temperatures which are a key requirement with respect to desired properties of the resulting solid surface material. Most importantly, a high networking density improves the scratch resistance, chemical resistance, hardness and weathering resistance of these materials.

Preferred polyols A1 are aliphatic, cyloaliphatic, aromatic as well as heterocyclic polyols. If aromatic polyols are present in the formulation, they preferably comprise less than 20 wt.-%, more preferably less than 10 wt.-%, even more preferably less than 5 wt.-% and most preferably less than 1 wt.-% of the polyol. Preferably, said polyols exhibit an OH-functionality of at least 2. More preferred polyols A1 are selected from the list consisting of glycol, glycerol, propanediol, butanediol, 1,2,10-decanetriol, 1,2,8-octanetriol, 1,2,3-trihydroxybenzene, 1,1,1-trimethylolpropane, 1,1,1-trimethylolethane, pentaerythritol and sugarpolyols. Most preferably, the polyol A1 is glycerol.

The stoichiometric ratio of the polyisocyanate component with respect to the polyol component was adjusted to be in between (0.85/1.0 and 1.2/1.0, preferably in between 0.9/1.0 and 1.1/1.0, most preferred to be 1.0/1.0).

The term "polyol component" refers to all compounds in the polymerizable composition which have free hydroxyl groups. The polyol A1 makes up at least 80 wt.-%, preferably at least 85 wt.-%, more preferably at least 90 wt.-% and most preferably at least 95 wt.-% of the polyol component of the polymerizable composition. The high proportion of the polyol A1 in the polyol component of the polymerizable composition is important in order to achieve a high network density of urethane groups and, concomitantly, a high glass transition temperature.

Polyisocyanate A2

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

When general reference is made here to "polyisocyanates", this means monomeric and/or oligomeric polyisocyanates alike. For understanding many aspects of the invention, however, it is important to distinguish between monomeric diisocyanates and oligomeric polyisocyanates. When reference is made here to "oligomeric polyisocyanates", this means polyisocyanates formed from at least two monomeric diisocyanate molecules, i.e. compounds that constitute or contain a reaction product formed from at least two monomeric diisocyanate molecules.

For example, hexamethylene diisocyanate (HDI) is a "monomeric diisocyanate" since it contains two isocyanate groups and is not a reaction product of at least two polyisocyanate molecules:

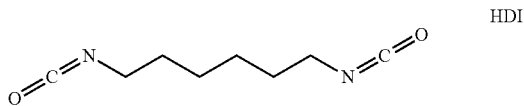 [SMILES: O=C=NCCCCCCN=C=O]

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

(idealized structural formulae)

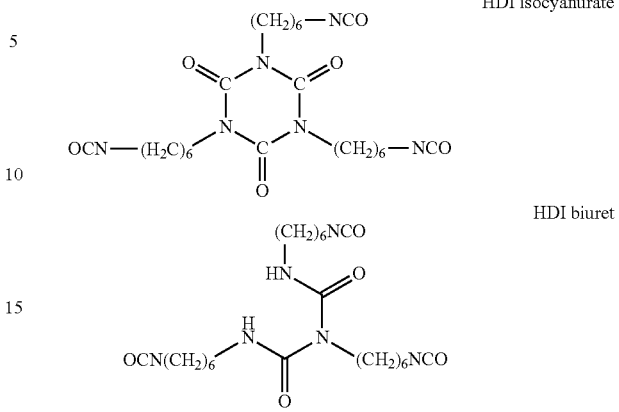

In the context of the present invention both monomeric as well as oligomeric isocyantes are equally useful. However, in a preferred embodiment of the present invention, the solid surface material is made from a polymerizable composition wherein oligomeric polyisocyanates make up at least 5 wt.-%, more preferably at least 10 wt.-%, even more preferably at least 25 wt.-% and most preferably at least 50 wt.-% of the total mass of isocyanates comprised by the polymerizable composition.

In an especially preferred embodiment of the present invention oligomeric polyisocyanates make up at least 95 wt.-% and, more preferably at least 98 wt.-% of the total mass of isocyanates comprised by the polymerizable composition. Such isocyanate compositions which have a low content of monomeric polyisocyanates can be obtained by reacting monomeric polyisocyanates under suitable reaction conditions and subsequently removing unreacted monomeric polyisocyanates, e.g. by thin film distillation.

Preparation processes for oligomeric polyisocyanates suitable for the present invention are described, for example, in J. Prakt. Chem. 336 (1994) 185-200, in DE-A 1 670 666, DE-A 1954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

Polyisocyanates which are especially suitable for use in the present invention are preferably selected from the list consisting of 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocydohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicydohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicydohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7- diisocyanatoadamantane, 1,3- and 1,4-bis (isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and combinations thereof. If oligomeric polyisocyanates are used, they are preferably based on the aforementioned monomeric polyisocyanates.

Amongst these polyisocyanates aliphatic and cycloaliphatic polyisocyanates are particularly preferred. The particularly preferred aliphatic polyisocyanates are preferably selected from the list consisting of 1,6-hexane diisocyanate (HDI), dicyclohexylmethane-4,4'-diisocyanate (H12MDI), isophorone diisocyanate (IPDI), 2,2,4-trimethyl-hexamethylene diisocyanate (TMDI) and pentamethylene diisocyanate 5 (PDI).

In a particularly preferred embodiment of the present invention, aliphatic and cycloaliphatic polyisocyanates as defined above make up at least 60 wt.-%, more preferably at least 80 wt.-%, even more preferably at least 90 wt.-% and most preferably at least 95 wt.-% of the total mass of isocyanates in the polymerizable composition. In a very particularly preferred embodiment of the present invention the polymerizable composition is free of aromatic and araliphatic polyisocyanates.

In a further particularly preferred embodiment of the present invention oligomeric polyisocyanates make up at least 60 wt.-%, more preferably at least 80 wt.-%, even more preferably at least 90 wt.-% and most preferably at least 95 wt.-% of the total mass of isocyanates in the polymerizable composition. The use of oligomeric rather than monomeric polyisocyanates contributes to an improved safety when it comes to handling these materials because oligomers have a lower vapor pressure than monomers.

According to the invention it is possible to use combinations of at least two or at least three different monomeric and/or oligomeric polyisocyanates a component (ii).

In order to adjust the viscosity of the polyisocyanate component (ii) of the polymerizable composition it is particularly advantageous to combine at least one monomeric polyisocyanate with at least one oligomeric polyisocyanate. Said oligomeric polyisocyanate may be based on the monomeric polyisocyanate employed. It may also be based on a monomeric polyisocyanate which is not present in the polymerizable composition as monomer. The aforementioned combination of oligomeric and monomeric polyisocyanates is also useful for decreasing volume shrinkage during the curing process of the polymerizable composition.

Organic Filler B1

Preferred organic fillers B1 are selected from the group consisting of polyethylene, high density polyethylene, polyvinyl chloride, silicone, polycarbonate, polyamide 11, polyamide 12, thermoplastic polyurethane, polyurea powder and polypropylene. Preferably, the grain sizes are in the range of 1-300 µm, most preferably they exhibit a grain size of 200 µm to 300 µm.

Preferably, the organic filler B1 makes up at least 5 wt.-%, more preferably at least 15 wt.-%, even more preferably more than 40 wt.-% and most preferably at least 60 wt.-% of the total mass of the polymerizable composition.

Inorganic Filler B2

More preferred inorganic fillers are selected from the group consisting of alumina trihydrate, quartz and dolomite. Preferably alumina trihydrate has a density of 2.45 g/cm$^3$ and a Mohs hardness of 2.5 to 3.5. Preferably, quartz has a density of 2.65 g/cm$^3$ and a Mohs hardness of 7.0. Preferably, dolomit has a density of 2.9 g/cm$^3$ and a Mohs hardness of 3.5 to 4.0. The most preferred inorganic filler B2 is alumina trihydrate.

The term "not dried" when describing the inorganic filler B2 refers to a material which has not been subjected to temperatures above of more than 50° C., more preferably more than 80° C. and most preferably more than 120° C. in the last 24 hours before adding it to the polymerizable composition. Therefore, the inorganic filler contains water which is bound as water of crystallization or present as relict of air humidity. Preferably, the inorganic filler has been stored between −10° C. and 50° C. and in the presence of an air humidity between 3 g/m$^3$ and 15 g/m$^3$ for at least 48 hours before adding it to the polymerizable composition.

The term "not dried" means that, although these fillers are hygroscopic, these are added to the formulation without a previous processing step aimed to reduce the water content. Therefore, they have the water content which they get under the storage conditions mentioned above.

Preferably, undried inorganic fillers have a water content of at least 0.15 wt.-%, more preferably of 0.9 wt.-%. The upper limit of the water content of a suitable inorganic filler B2 is preferably 5 wt.-%, more preferably 3 wt.-%.

The total water content of the polymerizable composition depends on the water content of the inorganic filler as well as the proportion of inorganic filler to the total mass of the composition.

Preferably, the total water content of the polymerizable composition which is mostly introduced through the inorganic filler B2 ranges from 0.1 wt.-% to 4.0 wt.-%, more preferably from 0.2 wt.-% to 3.0 wt.-% and most preferably from 0.2 wt.-% to 2.0 wt.-%. To achieve a defect free surface it can even be preferred to deliberately add water to adjust the total water content according to the above specified range.

Preferably, the inorganic filler B2 makes up at least 25 wt.-%, more preferably at least 50 wt.-%, even more preferably at least 70 wt.-% and most preferably at least 80 wt.-% of the total mass of the polymerizable composition. In principle, high concentrations of the inorganic filler are desirable in order to optimize the properties of the solid surface material. However, there is an upper limit of filler content because there must be a sufficient proportion of matrix material to promote the cohesion of the solid surface material. Therefore, the content of inorganic filler does not exceed 65 wt.-%.

Organic filler B1 and inorganic filler B2 are, preferably, used in a weight ratio from 1% B1 and 99% B2 to 99% B1 and 1% B2, more preferably ratio from 10% B1 and 90% B2 to 90% B1 and 10% B2.

Catalyst

Preferably, the polymerizable composition additionally comprises a catalyst C. Suitable as catalyst C is any compound which mediates the formation of urethane groups from isocyanates and polyols. Such compounds are well known to the person skilled in the art.

Preferred catalysts C are dibutyl tin laurate, zinc neodenoate, bismuth carboxylate or combinations thereof.

Further preferred catalysts are selected from the group consisting of Ammonium formiate, ammonium acetate, ammonium octanoate, tin(II) acetate, tin(II) octoate, tin(II) ethylhexoate, tin(II) laurate, dibutyltin diacetate, dibutyltin dilaurate, dibutyltin maleate, dimethyltin dineodecanoate, dimethyltin dioleate, dimethyltin laurylmercaotid, dioctyltin dineodecanoate, dioctyltin diacetate, bismuth 2-ethylhexanoate, cobalt 2-ethylhexanoate, iron 2-ethylhexanoate, sodium acetate, sodium octoate, kalium formiate, kalium acetate, kalium ethylhexaote, kalium octoate and mixtures thereof.

The polymerizable composition of the present invention preferably comprises the catalyst as defined above in an amount between 0.1% and 2% by weight in the final composition.

Microspheres

In a preferred embodiment, the polymerizable composition additionally comprises expendable microspheres D. Said microspheres may be filled or empty. Preferably, they are filled with a hydrocarbon which acts as a blowing agent, i.e. which expands if the polymerizable composition is heated. The microspheres have a cover which is made from a thermoplastic material so that is softens if heat is applied and allows the expansion of the microsphere. Since the microspheres during the curing process which involves heating of the polymerizable composition, their expansion increases the volume of the composition and, thus, counteracts the volume shrinkage which is caused by the crosslinking of isocyanate and hydroxyl groups. Therefore, microspheres improve the dimensional stability and the quality of the surfaces of the solid surface material.

Preferably, unexpanded, i.e. expandable, microspheres have a diameter between 1 μm and 1 mm, more preferably 2 μm to 0.5 mm and most preferred between 5 μm to 50 μm. After expansion their diameter increases preferably by a factor between 2 and 5.

The cover of the microsphere is preferably made from a material made from monomers selected from the group consisting of vinyl chloride, vinylidene chloride, acrylonitrile, methyl methacrylate or styrene, 5 and mixtures thereof. Preferred blowing agents are selected from the group consisting of freons, n-pentane, i-pentane, neopentane, butane and i-butane. A preferred freon is trichlorofluoromethane.

The blowing agent preferably constitutes 5-30% wt of the weight of the microsphere. An example of a suitable preferred and commercially available microsphere product is Expancel (trademark) having a thermoplastic cover of a vinylidene chloride copolymer/acrylonitrile and isobutane as blowing agent.

The microspheres D are preferably added to the polymerizable composition in an amount which makes up between 0.1 wt.-% and 18 wt.-%, more preferably between 0.1 wt.-% and 5.0 wt.-% based on the total mass of the polymerizable composition.

In a particular case, it has been shown that when adding more thermoplastic expandable microspheres, at least 3% wt over the whole amount of the final composition, the structure of the already crosslinked polyurethane solid can have two distinctly different densities: a compact density greater than 1100 g/cm3, typical for solid surface materials with a sheet thickness of 2 to 5 mm in the outer part and a low or medium density of 200 to 800 g/cm3, in the inner part or core. This feature makes the piece have a sandwich type structure which provides very improved physical properties such as, for example, good resistance to breakage and impact, with a lower final weight of the piece.

Additives

In a preferred embodiment of the present invention the polymerizable composition further comprises at least one additive E. Suitable additives depend on the transformation process and the type of polyurethane. Preferred additives which can be used in the present invention are stabilizers, foaming agents, flame retarding agents and compounds protecting the polyurethane against hydrolytic degradation, oxidation or ultraviolet light or pigments. In addition to the above additives, nowadays different types of nanoparticles may be incorporated into the polymer matrix to achieve specific properties. Nanoparticles are organic or inorganic particles ranging in size from 1 to 100 nm.

Advantages

Volume shrinkage is a common problem when it comes to casting solid surface materials. For example materials based on polyester, methyl-metacrylate or polymethyl-metacrylate exhibit volume shrinkage of 10-15% upon curing, whereas for polyurethanes it is in the range of 3-5%, thus allowing for more complex designs of the cured solid surface piece. Therefore, the use of polyurethane as a matrix material has important advantages. Surprisingly, it could be shown that the use of polyurethane as matrix material in reaction injection molding does not require the drying of inorganic fillers before use. Thus, the present invention provides novel solid surface material with improved properties which can be manufactured by a fast and cheap process.

Solid Surface Material

As set forth above, the curing of polymerizable composition according to the present invention yields a solid surface material. Therefore, in another embodiment, the present invention relates to a solid surface material comprising a) a polyurethane matrix having a glass transition temperature of at least 45° C. comprising as building blocks
  (i) at least one polyol A1 having an OH-content of at least 25 wt.-%; and
  (ii) at least one polyisocyanate A2 comprising at least 60 wt.-% of aliphatic and cycloaliphatic polyisocyanates;
  wherein the polyol A1 makes up at least 80 wt.-% of all hydroxyl-functional compounds in the polyurethane matrix; and
b) at least one organic filler B1 and at least one inorganic filler B2, wherein the inorganic filler B2 is not dried.

All definitions given above with regard to the components of the polymerizable composition and their proportions in the polymerizable composition also apply to this embodiment.

The term "solid surface material" is well known to the person skilled in the art. It refers to a non-porous solid material comprising a polymer matrix and a filler. A preferred definition of solid surface materials can be found in ISO Standard 19712-1UNE.EN: 2013.

Said filler may be an organic filler B1 as described above in further detail or it may be an inorganic filler B2 also described above in further detail. Preferably, the solid surface material comprises both an organic filler B1 and an inorganic filler B2. The material is, preferably, homogenous throughout its thickness, i.e. it has the same composition and structure in every part.

The polymer matrix of the solid surface material comprises a polyurethane comprising at least one polyol A1 and at least one polyisocyanate A2 as described above. More preferably, the polymer matrix consists of such a polyurethane, i.e. the polyurethane matrix is produced from the polymerizable composition defined further above in the present application. The polymer matrix of the solid surface material is the part of the material which forms a continuous phase in which the organic and/or inorganic fillers are dispersed.

The glass transition temperature of the polyurethane matrix is at least 45° C., preferably at least 65° C. and more preferably at least 85° C. Thus, the solid surface material of the present invention is not an elastomer. A material only displays elastomeric properties if it is used at a temperature well below its glass transition temperature.

In a preferred embodiment of the present invention, the solid surface material defined above is made using the polymerizable composition of the invention in the reaction molding process (RIM).

Method

In another embodiment, the present invention relates to a method for manufacturing a solid surface material having a glass transition temperature of at least 45° C. comprising the steps of a) mixing of at least one polyol A1 having an OH-content of at least 25 wt.-%, at least one polyisocyanate A2 comprising at least 60 wt.-% of aliphatic and cycloaliphatic polyisocyanates, at least one organic filler B1 and at least one inorganic filler B2;

wherein the polyol A1 makes up at least 80 wt.-% of all hydroxyl-functional compounds in the reaction mixture obtained in method step a);

b) filling of the reaction mixture obtained in method step a) into a mold; and c) curing of the reaction mixture.

All definitions given above also apply to this embodiment of the invention unless specified otherwise.

Method step a) is preferably performed not more than 5 minutes, more preferably not more than 2 minutes, even more preferably not more than 1 minute and, most preferably not more than 30 seconds before initiating method step b).

The polyol A1 makes up at least 80 wt.-%, preferably at least 85 wt.-%, more preferably at least 90 wt.-% and most preferably at least 95 wt.-% of all hydroxyl-functional compounds in the reaction mixture obtained in method step a). It is particularly preferred that this limitation also applies to the reaction mixture cured in method step c), i.e. that before the curing in method step c) hydroxyl-functional compounds other than polyol A1 are only added in an amount which does not decrease the proportion of polyol A1 below the values set forth above.

The mold used in the method of the present invention is, preferably, a closed mold. Preferably, the reaction mixture obtained in method step a) is filled into said closed mold under pressure within the range of 2 bar to 3500 bar, more preferably 2 bar to 200 bar and most preferably 2 bar to 14 bar. Preferably, the mold used in the method of the present invention has a temperature between 25° C. and 130° C., more preferably between 25° C. and 80° C. The curing process in method step c) is finished when the polymerizable composition has become solid and can be manipulated. The time required for reaching this stage depends on the temperature of the mold, the catalyst and its concentration as well as the shape and size of the product. Required curing times can easily be determined by simple experiments. Preferred curing times are between 5 minutes and 60 minutes.

The insertion of the polymerizable composition into a dosed mold and the subsequent curing of the composition in the dosed mold is known as reaction injection molding.

In another embodiment, the present invention relates to a solid surface material obtained by the method describes above.

Yet another embodiment of the present invention relates to the use of the polymerizable composition of the invention for manufacturing a product selected from the group consisting of facades, panels, claddings, window frames, ceilings, grids, stairs, garden furniture, tables, chairs, beds, doors, frames, sinks, basins, shower plates, loungers, umbrella stands, pool claddings, tiles, playgrounds, benches, stools, flower boxes, racks, shelfs, vases, wardrobes, coatracks, commodes, lamps, countertops, bars, shoe racks and boxes. Said products are suitable for interior and exterior use.

In a first item, the present invention relates to a polymerizable composition comprising
  (i) at least one polyol A1;
  (ii) at least one polyisocyanate A2;
  (iii) at least one organic filler B1; and
  (iv) least one inorganic filler B2, wherein the inorganic filler B2 is not dried.

In a second item, the present invention relates to the polymerizable composition according to item 1, wherein said polymerizable composition comprises at least 25 wt.-% inorganic filler B2 based on the total mass of the total mass of the polymerizable composition.

In a third item, the present invention relates to the polymerizable composition according to item 1 or 2, wherein said polymerizable composition comprises at least 5 wt.-% organic filler B1 based on the total mass of the polymerizable composition.

In a fourth item, the present invention relates to the polymerizable composition according to any one of items 1 to 3, wherein the polyisocyanate A2 comprises at least 5 wt.-% oligomeric polyisocyanates.

In a fifth item, the present invention relates to the polymerizable composition according to any one of items 1 to 4, wherein the inorganic filler is selected from the group consisting of alumina trihydrate, quartz and dolomite.

In a sixth item, the present invention relates to the polymerizable composition according to any one of items 1 to 5, wherein the inorganic filler has a water content of at least 0.15 wt.-%.

In a seventh item, the present invention relates to the polymerizable composition according to any one of items 1 to 6, wherein the organic filler B1 is selected from the group consisting of polyethylene, high density polyethylene, polyvinyl chloride, silicone, polycarbonate, polyamide 11, polyamide 12, thermoplastic polyurethane, polyurea powder and polypropylene.

In an eighth item, the present invention relates to the use of the polymerizable composition according to any one of items 1 to 7 for manufacturing a solid surface material.

In a ninth item, the present invention relates to a solid surface material comprising
  a) a polyurethane matrix comprising as building blocks
    (i) at least one polyol A1; and
    (ii) at least one polyisocyanate A2;
  b) at least one organic filler B1 and at least one inorganic filler B2, wherein the inorganic filler B2 is not dried.

In a tenth item, the present invention relates to a method for manufacturing a solid surface material comprising the steps of
  a) mixing of at least one polyol A1, at least one polyisocyanate A2, at least one organic filler B1 and at least one inorganic filler B2;
  b) filling of the reaction mixture obtained in method step a) into a mold; and
  c) curing of the reaction mixture.

In an eleventh item, the present invention relates to the method according to item 10, wherein the method is a reaction molding process.

In a twelfth item, the present invention relates to Solid surface material obtained by the method according to item 10 or 11.

The following examples are only intended to illustrate the invention. They shall not limit the scope of the claims in any way.

EXAMPLES

Materials:
Desmodur N3600: solvent free HDI based isocyanurate
Desmodur XP2489 solvent free HDI/IPDI polyisocyanate
The technical data sheet for alumina trihydrate mentions a water content of 0.25% at 105° C. The sample was stored at RT in the laboratory.

Example 1 (Inventive)

1A Solid Surface Material with Inorganic Fillers
Matrix with Standard Tg:
Desmodur N3600 and glycerol (NCO:OH=1) were mixed with alumina trihydrate with standard mixing equipment to yield a weight ratio of resin to filler of 70:30.0.005 wt.-% of dibutyltin laurate as catalyst were added.

The reaction mixture was injected into a mold (1 cm×15 cm×10 cm) at a pressure of 5 bar and demolded after 20 minutes.

The reacted solid surface material displayed a glass transition temperature of 103° C.
Matrix with High Tg
Desmodur XP2489 and glycerol (NCO:OH=1) were warmed to 50° C. and mixed with alumina trihydrate with standard mixing equipment to yield a ratio of resin to filler of 70:30.0.005 wt.-% of dibutyltin laurate as catalyst were added.

The reaction mixture was injected into a mold (1 cm×15 cm×10 cm) at a pressure of 5 bar and demolded after 20 minutes.

The reacted solid surface material displayed a glass transition temperature of 160° C.

The optical evaluation of both products showed an even and homogeneous surface without defects. A cut across the surface showed an homogeneous material without visible bubbles.

Example 2 (Comparative)

Desmodur XP2489, glycerol (NCO:OH=1) and alumina trihydrate were mixed in a speed mixer for 30 seconds at 3500 rpm to yield a ratio of resin to filler of 70:30. The reaction mixture was then filled into an open mold at room temperature.

After curing for 8 hours at 130° C., the material was tested for its optical and mechanical properties. The result was an uneven surface which does not suffice the aesthetics of a common solid surface material. There were open and closed bubbles present in the surface.

The invention claimed is:

1. A polymerizable composition comprising
(i) at least one polyol A1 having an OH-content of at least 25 wt.-%, wherein the at least one polyol A1 is selected from the group consisting of glycerol, propanediol, butanediol, 1,2,10-decanetriol, 1,2,8-octanetriol, 1,2,3-trihydroxybenzene, 1,1,1-trimethylolpropane, 1,1,1-trimethylolethane, penthaerythrol and sugar polyols;
(ii) at least one polyisocyanate A2 comprising at least 60 wt.-% of aliphatic polyisocyanates;
(iii) at least one organic filler B1;
(iv) at least one inorganic filler B2, wherein the inorganic filler B2 is not dried and comprises a water content of at least 0.15 wt.-%; and
(v) expandable microspheres;
wherein the polyol A1 makes up at least 95 wt.-% of all hydroxyl-functional compounds in the polymerizable composition, and
wherein the polymerizable composition is for reaction injection molding.

2. The polymerizable composition according to claim 1, wherein the polymerizable composition comprises at least 25 wt.-% inorganic filler B2 based on the total mass of the total mass of the polymerizable composition.

3. The polymerizable composition according to claim 1, wherein the polymerizable composition comprises at least 5 wt.-% organic filler B1 based on the total mass of the polymerizable composition.

4. The polymerizable composition according to claim 1, wherein the polyisocyanate A2 comprises at least 5 wt.-% oligomeric polyisocyanates.

5. The polymerizable composition according to claim 1, wherein the inorganic filler is selected from the group consisting of alumina trihydrate, quartz and dolomite.

6. The polymerizable composition according to claim 1, wherein an upper limit of the water content of the inorganic filler is 5 wt.-%.

7. The polymerizable composition according to claim 1, wherein the organic filler B1 is selected from the group consisting of polyethylene, high density polyethylene, polyvinyl chloride, silicone, polycarbonate, polyamide 11, polyamide 12, thermoplastic polyurethane, polyurea powder and polypropylene.

8. A method comprising utilizing the polymerizable composition according to claim 1 for manufacturing a solid surface material.

9. A solid surface material comprising
a) a polyurethane matrix comprising as building blocks
(i) at least one polyol A1 having an OH-content of at least 25 wt.-%, wherein the at least one polyol A1 is selected from the group consisting of glycerol, propanediol, butanediol, 1,2,10-decanetriol, 1,2,8-octanetriol, 1,2,3-trihydroxybenzene, 1,1,1-trimethylolpropane, 1,1,1-trimethylolethane, penthaerythrol and sugar polyols; and
(ii) at least one polyisocyanate A2 comprising at least 60 wt.-% of aliphatic polyisocyanates;
wherein the polyol A1 makes up at least 95 wt.-% of all hydroxyl-functional compounds in the polyurethane matrix; and
b) at least one organic filler B1, at least one inorganic filler B2, wherein the inorganic filler B2 is not dried and comprises a water content of at least 0.15 wt.-%, and expandable microspheres,
wherein the solid surface material is formed by a reaction molding process.

10. The solid surface material of claim 9, having a density of at least 1000 kg/m$^3$.

11. A method for manufacturing a solid surface material comprising the steps of
a) mixing of (i) at least one polyol A1 having an OH-content of at least 25 wt.-%, wherein the at least one polyol A1 is selected from the group consisting of glycerol, propanediol, butanediol, 1,2,10-decanetriol, 1,2,8-octanetriol, 1,2,3-trihydroxybenzene, 1,1,1-trimethylolpropane, 1,1,1-trimethylolethane, penthaerythrol and sugar polyols, (ii) at least one polyisocyanate A2 comprising at least 60 wt.-% of aliphatic and cycloaliphatic polyisocyanates, (iii) at least one organic filler B1, (iv) at least one inorganic filler B2, wherein the inorganic filler B2 is not dried and comprises a water content of at least 0.15 wt.-%, and (v) expandable microspheres;

wherein the polyol A1 makes up at least 80 wt.-% of all hydroxyl-functional compounds in the reaction mixture obtained in method step a);

b) filling of the reaction mixture obtained in method step a) into a closed mold; and c) curing of the reaction mixture, wherein the method is a reaction molding process.

12. A solid surface material obtained by the method according to claim 11.

* * * * *